(12) United States Patent
Aasbo et al.

(10) Patent No.: US 6,417,457 B1
(45) Date of Patent: Jul. 9, 2002

(54) ELECTRICAL SUBSEA CABLE

(75) Inventors: Anders Tapio Aasbo, Askim; Petter Tomas Holen, Klofta; Jan Erik Karlsen, Kolbotn, all of (NO)

(73) Assignee: Nexans, Paris (FR)

( * ) Notice: Subject to any disclaimer, the term of this patent is extended or adjusted under 35 U.S.C. 154(b) by 0 days.

(21) Appl. No.: 09/588,187

(22) Filed: Jun. 7, 2000

(30) Foreign Application Priority Data

Jun. 17, 1999 (NO) ............................................. 99 2 971

(51) Int. Cl.[7] ................................................. H01B 7/18
(52) U.S. Cl. ................................................. 174/120 R
(58) Field of Search ........................ 174/120 R, 120 SR, 174/120 SC, 106 R, 106 SC; 138/108, 120, 121, 137, 140

(56) References Cited

U.S. PATENT DOCUMENTS

| | | | | |
|---|---|---|---|---|
| 3,060,069 A | * | 10/1962 | Sindars | 138/120 |
| 3,720,235 A | * | 3/1973 | Schrock | 138/137 |
| 3,812,738 A | * | 5/1974 | Courtot | 138/108 X |
| 3,878,319 A | * | 4/1975 | Wahl | 174/120 SC X |
| 4,197,423 A | * | 4/1980 | Fusen | 174/120 SC X |
| 4,520,230 A | * | 5/1985 | Uesugi et al. | 174/120 SC X |
| 4,892,442 A | * | 1/1990 | Shoffner | 138/141 |
| 5,048,572 A | * | 9/1991 | Levine | 138/121 |
| 5,426,264 A | * | 6/1995 | Livingston et al. | 174/120 R X |
| 5,553,666 A | | 9/1996 | Hartman | 166/60 |
| 5,706,864 A | * | 1/1998 | Pfleger | 138/121 |
| 5,789,708 A | * | 8/1998 | Cocito | 174/68.1 |

FOREIGN PATENT DOCUMENTS

| | | |
|---|---|---|
| EP | 0 806 779 A1 | 11/1997 |
| GB | 1 339 561 | 12/1973 |
| GB | 2 244 414 A | 11/1991 |
| NO | 984235 | 9/1998 |
| WO | WO 90/01209 | 2/1990 |

* cited by examiner

Primary Examiner—Chau N. Nguyen
(74) Attorney, Agent, or Firm—Sughrue Mion, PLLC

(57) ABSTRACT

An electrical subsea cable with a conductor (21), an insulation (23) and a sheath is proposed. The sheath has two polymer layers (26, 27), wherein the outer layer (27) has a mechanical hardness which is higher than the hardness of the insulation (23) and wherein the hardness of the inner layer (26) is lower than the hardness of the insulation(23).

26 Claims, 3 Drawing Sheets

ELECTRICAL SUBSEA CABLE

BACKGROUND OF THE INVENTION

The present invention relates to an electrical subsea cable with a conductor, an insulation and a sheath.

For the energy supply of electrical devices on the seafloor, subsea cables are known in the state of the art which contain one or several conductors with an insulation, typically made of cross-linked polyethylene, and an outer sheath. In cables for the medium high voltage range, the insulation comprises an inner screen adjacent to the surface of the conductor and a second screen on the outer surface of the insulation. The cable is generally armoured to be protected from damage which may be caused by outer impact forces, e.g. by fishing gears.

To prevent the blocking of oil pipelines by freezing oil components, especially when the flow is stopped, electrical heating systems are utilised. Patent application NO 1998 4235 describes an example of a heating system which can be used for pipelines on the sea floor. In this system, the metallic tube of the pipeline is electrically and thermally insulated and connected to a power supply which feeds a current through the tube. As the tube generally consists of ferromagnetic steel, an efficient heating is achieved with alternating current.

A subsea cable for the connection of the pipeline and the power supply may be squeezed during installation between the pipeline and hard objects, even if care is taken to avoid this situation. As the pipeline expands and contracts during operation, the cable is generally subject to stretching and sliding forces against the seabed. These problems are aggravated, if the pipeline spans valleys between reefs or boulders on the seabed. In addition, the cable has to be protected from impact forces which may be caused by fishing gears or falling objects.

A sufficient protection can be achieved with a steel armouring if the cable carries both the feeding and the return current. The above heating system, however, requires only a single conductor because the tube of the pipeline is used as conductor. In this case, an alternating current causes excessive electrical losses if a metal armour is applied to the cable. Another conceivable approach is an increase of the insulation thickness to provide the required protection. This would result in a disadvantageously high cable diameter.

SUMMARY OF THE INVENTION

It is therefore an object of the present invention to obviate these disadvantages and to develop an electrical subsea cable with a metal-free sheath which protects the cable from outer forces. It is a further object, to provide a cable with a small outer diameter.

According to the invention, the sheath comprises two polymer layers, wherein the outer layer has a mechanical hardness which is higher than the hardness of the insulation and wherein the hardness of the inner layer is lower than the hardness of the insulation.

A basic concept of the invention is a sheath which comprises at least two layers consisting of polymer materials with different mechanical properties. The outer layer is made of an elastic material with a high mechanical hardness, e.g. polyamide 12. An inner layer has a hardness which is lower than both the hardness of the insulation and the outer layer. For a cable with an insulation of cross-linked polyethylene, an inner layer of soft thermoplastic polyurethane elastomer is proposed. The rubber-like bedding ensures that damages of the insulation are avoided even if the outer layer is deformed due to outer forces. Consequently, the thickness of the outer layer can be reduced because small elastic deformations do not affect the insulation. A low total diameter of the subsea cable can be attained. Because the sheath is metal-free, electrical losses are avoided for a single conductor AC cable.

In a preferred embodiment of the invention, the sheath is extruded around the insulation. The inner layer is extruded on the outer surface of the insulation which will generally comprise an outer screen. It is conceivable, that the insulation or the screen is covered with a separating agent. At least one outer layer is extruded on the inner layer.

The sheath can be detachably fixed on the insulation. In this case, it is possible to insert the insulated conductor into the sheath when the cable is installed or remove it.

In an advantageous embodiment, the sheath has a slit parallel to the axis of the cable. This allows to insert the insulated conductors via the slit or equivalently to snap the sheath onto the insulation.

The cable may be subject to high axial forces, especially near the ends where it is fixed to other devices. To improve the resistance against axial forces, it is proposed that the sheath comprises fibres 45 (see, e.g., FIG. 3a) made from dielectric material, for example aramide. The fibres are disposed in or adjacent to the hard layer of the sheath to ensure an efficient transfer of forces. They can be limited to sections of the cable with especially high loading, e.g. near the ends, or the whole length of the sheath can be provided with fibres.

It is preferred that a gap is disposed between the sheath and the insulation. The gap is filled with water in the installed cable to avoid a compression of the sheath due to the hydrostatic pressure near the seabed. For this purpose, the gap is connected to the surroundings of the cable via the slit or other openings in the sheath or at the end of the cable. The water in the gap improves the cooling of the cable if sufficient circulation is allowed. Furthermore, the water enhances the damping properties of the inner layer if the outer layer is deformed due to impact forces.

Preferably the inner surface of the sheath is grooved wherein the grooves constitute a part of the gap between sheath and insulation. Protrusions between the grooves support the insulated cable core in the centre of the sheath. The grooves in the inner layer provide an additional damping compared to a compact inner layer.

To avoid capacitive charging of an outer screen on the insulation, metallic drain conductors can be used, e.g. a copper tape or copper wires. If the insulation of the cable is in contact with surrounding water, the insulation can comprise a semiconducting layer, e.g. semiconducting cross-linked PE, which encloses the outer screen instead of drain conductors. This avoids electrical losses due to metallic drain conductors.

In a preferred embodiment, the cable is fixed along a support, for example a pipeline for fluids. Suitable fixing means are straps.

A round cross-section of the cable is preferred when it is laid separately on the seabed. If the cable is fixed to a pipeline or a similar support, a surface of the sheath which is shaped complementary to the support is advantageous.

The proposed cable is suitable for use in an electrical heating system for an insulated metallic tube, especially a pipeline, wherein a current is fed through the wall of the tube. The electrical insulation generally serves simultaneously as thermal insulation and can consist for example of polypropylene. The tube is preferably made of a ferromagnetic material like steel and heated by an alternating current in the range of several 100 A to several kA and voltages between 1 and several ten kV, depending on the cross-section and the required heating power. The cable connects the tube to a power supply which can be an armoured rising cable from the seafloor to the surface where it is connected to a feeding unit. The heating system may either be closed, i.e. isolated from the surrounding sea. Alternatively, open systems may be used wherein a part of the current flows through the seawater.

The foregoing and other objects, features and advantages of the present invention will become more apparent in the following detailed description of preferred embodiments as illustrated in the accompanying drawings.

DETAILED DESCRIPTION OF THE INVENTION

Figure 1:
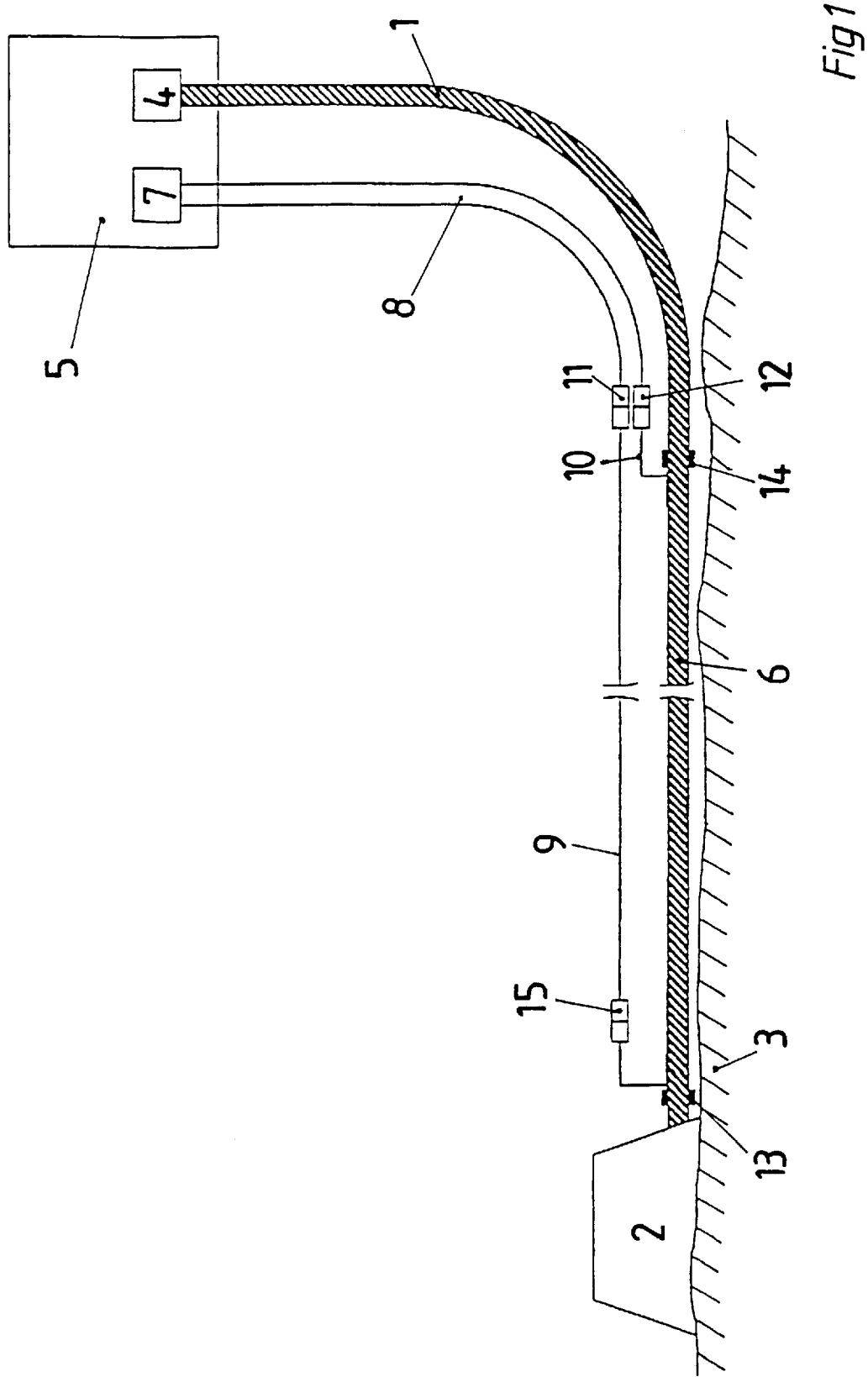
FIG. 1 shows a heating system with an electrical cable according to the invention.

In FIG. 1, a pipeline heating system which comprises a cable according to the present invention is illustrated. An insulated metal tube 1 (i. e. the pipeline) connects a template 2 on the seafloor 3 with a processing unit 4 installed on a platform 5. The tube 1 has an outer thermal insulation ensuring that crude oil coming from the template 2 has a sufficiently low viscosity until it reaches platform 5. If the oil flow is stopped, formation of hydrate plugs and wax deposits occur which can block the pipeline when oil transportation is to be resumed again.

To avoid this problem, the tube 1 can be heated. One or several sections 6 of tube 1 are connected to a power supply unit 7 installed on the platform 5 with a riser cable 8 containing one or more conductor pairs with an insulated feeder and return conductor. The riser cable 8 is protected by an armouring and an outer sheathing. At the lower end of the riser cable 8, single conductor cables 9, 10 connect a section 6 of tube 1 to a pair of feeder and return conductors in riser cable 8. For this purpose, connecting elements 11, 12, 15 are proposed. Insulating flanges 13, 14 insulate the sections 6 of a pipeline from each other. An insulating flange 13,14 can also be installed in the riser part of tube 1.

The power supply unit 7 generates an electrical AC current, preferably in the range of 500 to 2000 A, and a voltage which is preferably in the range of 5 to 40 kV. The current is fed via riser cable 8 and single conductor cables 9, 10 through a section 6 of tube 1. The AC current causes a heating of the tube and ensures a sufficiently low viscosity of the material inside. Instead of the closed system shown, open heating systems are conceivable, wherein a part of the current flows through the open sea via electrodes on the outer surface of tube 1 which are located at one or both ends of section 6. In this case, insulating flanges 13, 14 may be omitted.

Figure 2:
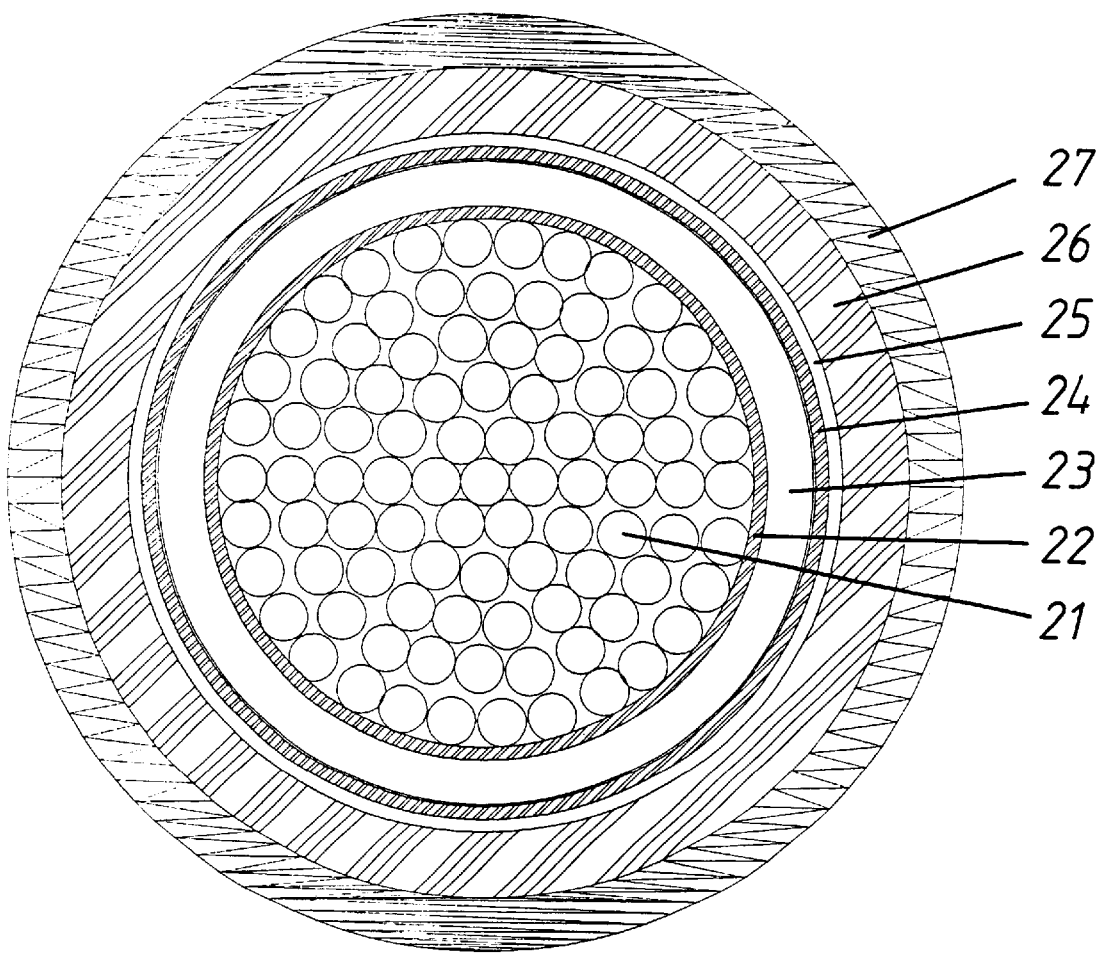
FIG. 2 shows a cross-section of a cable according to the invention.

The single conductor cables 9, 10 have a cross-section as it is shown in FIG. 2. The conductor 21 consists of stranded copper wires with a total cross-section which is for example in the range of 1000 mm². To prevent longitudinal water penetration and facilitate repair, gaps in the conductor are filled with a hydrophobic water-blocking compound. The conductor is surrounded by an inner screen 22 of semiconducting cross-linked PE, an insulation 23 of cross-linked PE with a preferred thickness between 2 and 5 mm and an insulation screen 24 consisting of semiconducting cross-liked PE. A metallic screen which comprises drain conductors 25, e.g. copper tape, can be used for grounding to avoid capacitive charging of insulating screen 24.

The outer sheath of the cable comprises two layers 26, 27. The outer layer 27 consists of a material with a mechanical hardness which is higher than the hardness of the insulation 23. A suitable material for layer 27 is polyamide 12 with a thickness in the range of 2 to 10 mm, preferably around 4 mm. The inner layer 26 is a softer material, e.g. polyurethane rubber, with a hardness both below the outer layer 27 and the insulation 23. If the outer layer 27 deforms elastically due to impact forces, the soft layer 26 avoids a transfer of the forces to sheath 23 with screen 24. Therefore, the thickness of layer 26 should be equal or larger than tolerable deformations of outer layer 27, a suitable thickness being in the range of 4 to 10 mm. Due to the combination of the layers 26, 27, the sheath gives a high protection to the cable core without metal armouring while allowing for a small total diameter of the cable. Impact loads of 5 kJ and above can be buffered using the proposed dimensions.

FIGS. 3a–3f illustrate different alternative embodiments of cables 9, 10. In all cases, a suitable core 30 consists of a conductor 21 and an insulation 23 with inner and outer screens 22, 24 as it is shown in FIG. 2. The outer sheath consists of a soft inner layer 31 and a hard outer layer 32 as described above. When the outer surface of core 30 is in contact with surrounding sea water, as is shown especially in FIG. 3 b, c, e and f, metallic drain conductors 25 may be replaced by a semiconducting layer. Capacitive charging of screen 24 is avoided by contact of the semiconducting layer to the sea water.

Figure 3A:
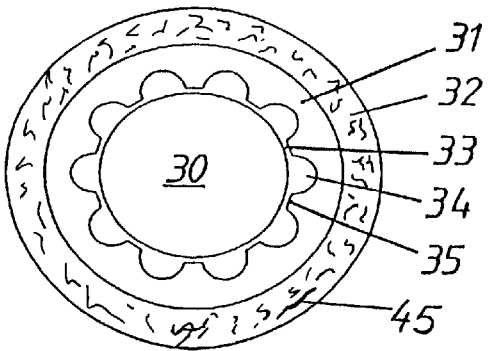
FIGS. 3a–3f show cross-sections through different alternative embodiments of the cable.

In FIG. 3a, the inner layer 31 and the core 30 are separated by a gap 33. Preferably, grooves 34 in the surface of inner layer 31 are separated by protrusions 35. Grooves 34 can extend in the longitudinal and/or transversal direction relative to the axis of the cable. In the installed cable, the gap 33 and grooves 34 are filled with water, which is connected to the surrounding sea via openings in the sheath or at the end of the cable. The water avoids a compression of the sheath under the hydrostatic pressure of the surrounding sea and enhances cooling, especially if circulation is possible. Furthermore, the gap 33 constitutes an additional damping layer. To improve the damping properties, openings to the surrounding sea can have a low cross section to create a sufficient flow restriction.

Figure 3B:
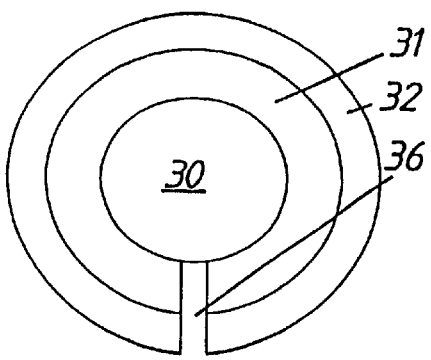
Figure 3C:
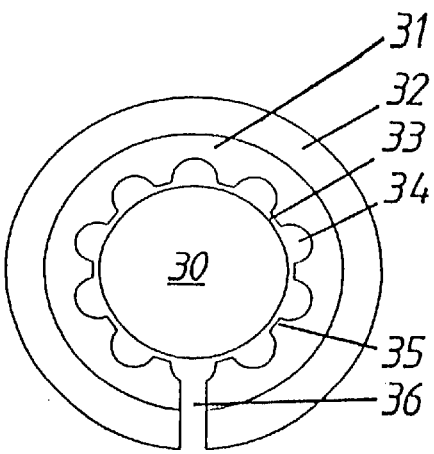

As an alternative to a sheath which is extruded around the core 30, the core 30 can be inserted into the sheath after manufacturing. For this purpose, the layers 31, 32 of the sheath are provided with a slit 36 (FIG. 3b). Due to the elastic material of the layers 31, 32, the core 30 can be inserted through the slit 36 into the sheath before or during installation of the cable. As it is shown in FIG. 3c, a slit 36 can also be combined with a gap 33 around core 30. In this embodiment, the slit 36 connects the gap 33 to the surrounding sea.

Figure 3D:
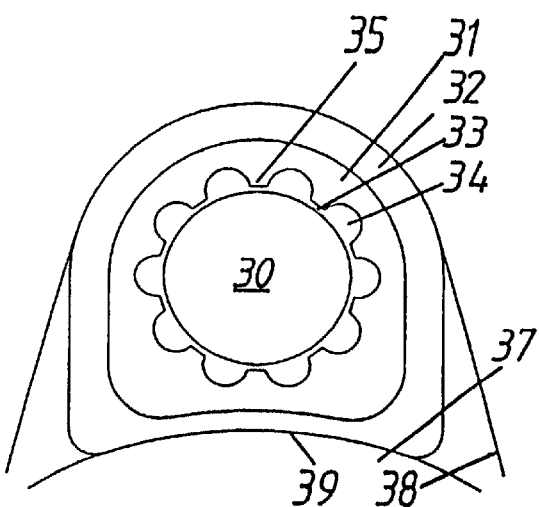
Figure 3E:
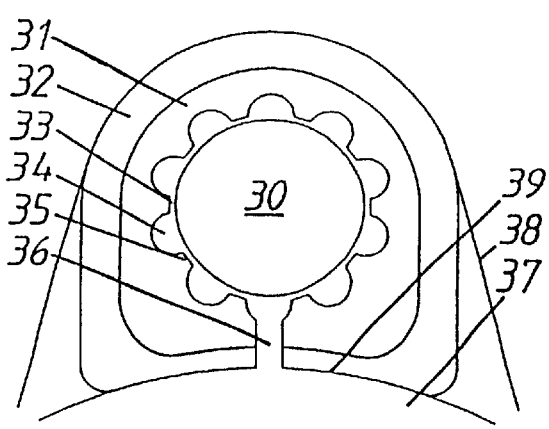

While it is possible that cables according to the invention extend separately on the seafloor, it is preferred for ease of installation that they are fixed along the tube 37 if they are used in conjunction with a pipeline (FIG. 3d). Suitable fixing means are straps 38 disposed at intervals around the cable and tube 37. To enhance fixing and handling of the assembly, the surface 39 of the cable which is adjacent to tube 37 is shaped complementary.

Figure 3F:
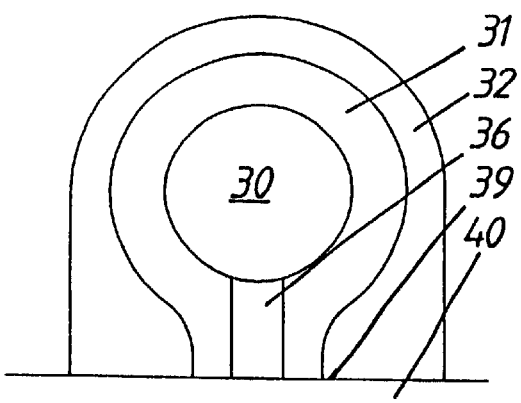

A complementary surface 39 may also be used in combination with a slit 36 in the sheath, as illustrated in FIG. 3a. Surface 39 can also be complementary to other supporting structures, e.g. a flat support 40 as shown in FIG. 3f. To ease insertion of the core 30 into the sheath, the sides of slit 36 are lined exclusively with the softer material of inner layer 31, especially if the shape of the outer layer 32 and support 40 ensure a sufficiently large contact area for an efficient transfer of impact forces.

The above embodiments admirably achieve the objects of the invention. However, it will be appreciated that departures can be made by those skilled in the art without departing from the scope of the invention which is limited only by the claims. Especially, the proposed design of the sheath can also be used with other types of cable cores and is not limited to single conductor cables. Cables according to the invention could also be used for energy supply purposes of installations other than a heating system.

What is claimed is:

1. An electrical subsea cable with a conductor, an insulation and a sheath, wherein the sheath comprises two polymer layers, wherein the outer layer of the sheath has a mechanical hardness that is higher than a hardness of the insulation, and wherein a hardness of an inner layer of the sheath is lower than the hardness of the insulation; and wherein the sheath has a slit (36) parallel to a lengthwise direction of the cable.

2. Cable according to claim 1, characterised in that the sheath is extruded around the insulation (23).

3. Cable according to claim 1, characterised in that the sheath is detachably fixed on the insulation (23).

4. Cable according to claim 1, characterised in that the sheath comprises reinforcing fibres.

5. Cable according to claim: 1, characterised in that a gap (33) is disposed between the sheath and the insulation (23).

6. Cable according to claim 5, characterised in that the inner surface of the sheath is provided with grooves (34).

7. Cable according to claim 1, characterised in that the insulation (23) comprises an outer screen (24) which is connected to metallic drain conductors (25).

8. Cable according to claims 1, further comprising an outer screen that is enclosed in a semiconductor layer.

9. Cable according to claim 1, characterised in that the cable is fixed along a support (40).

10. Cable according to claim 9, characterised in that a surface (39) of the sheath is shaped complementary to the surface of the support (40).

11. A heating system for an electrically insulated metal tube (1,37), which is connected to a power supply unit (7) by at least one electrical cable (9,10), characterized in that the at least one electrical cable is a single-conductor cable with a conductor, an insulation and a sheath, wherein the sheath comprises at least two polymer layers, wherein at least one outer layer of the sheath has a mechanical hardness that is higher than a hardness of the insulation, and wherein a hardness of at least one inner layer of the sheath is lower than the hardness of the insulation.

12. The heating system according to claim 11, characterised in that the sheath is extruded around the insulation.

13. The heating system according to claim 11, characterised in that the sheath is detachably fixed on the insulation.

14. The heating system according to claim 11, characterised in that the sheath comprises reinforcing fibres.

15. The heating system according to claim 11, characterised in that a gap is disposed between the sheath and the insulation.

16. The heating system according to claim 15, characterised in that the inner surface of the sheath is provided with grooves.

17. Cable according to claim 11, characterised in that the insulation comprises an outer screen which is connected to metallic drain conductors.

18. Cable according to claim 11, further comprising an outer screen that is enclosed in a semiconductor layer.

19. Cable according to claim 11, characterised in that the cable is fixed along a support (40).

20. Cable according to claim 19, characterised in that a surface of the sheath is shaped complementary to the surface of the support.

21. An electrical subsea cable, comprising:

a conductor, an insulation, and a sheath having an inner layer and an outer layer, wherein the outer layer has a hardness that is higher than the hardness of the insulation, wherein the hardness of the inner layer is lower than the hardness of the insulation, and wherein mechanical resistance of the cable is obtained primarily through the outer layer which is extruded, wherein the insulation, inner layer and outer layer provide protection against permanent deformation of the cable due to spending and absorption of impact energy; and wherein the sheath has a slit parallel to a lengthwise direction of the cable.

22. An electrical subsea cable with a conductor, an insulation and a sheath, wherein the sheath comprises two polymer layers, wherein the outer layer of the sheath has a mechanical hardness that is higher than a hardness of the insulation, and wherein a hardness of an inner layer of the sheath is lower than the hardness of the insulation; and wherein the sheath comprises reinforcing fibres.

23. An electrical subsea cable with a conductor, an insulation and a sheath, wherein the sheath comprises two polymer layers, wherein the outer layer of the sheath has a mechanical hardness that is higher than a hardness of the insulation, and wherein a hardness of an inner layer of the sheath is lower than the hardness of the insulation; and wherein a gap is disposed between the sheath and the insulation.

24. An electrical subsea cable with a conductor, an insulation and a sheath, wherein the sheath comprises two polymer layers, wherein the outer layer of the sheath has a mechanical hardness that is higher than a hardness of the insulation, and wherein a hardness of an inner layer of the sheath is lower than the hardness of the insulation; and wherein the insulation comprises an outer screen that is connected to metallic drain conductors.

25. An electrical subsea cable with a conductor, an insulation and a sheath, wherein the sheath comprises two polymer layers, wherein the outer layer of the sheath has a mechanical hardness that is higher than a hardness of the insulation, and wherein a hardness of an inner layer of the sheath is lower than the hardness of the insulation; and further comprising an outer screen that is enclosed in a semiconductor layer.

26. An electrical subsea cable with a conductor, an insulation and a sheath, wherein the sheath comprises two polymer layers, wherein the outer layer of the sheath has a mechanical hardness that is higher than a hardness of the insulation, and wherein a hardness of an inner layer of the sheath is lower than the hardness of the insulation; and wherein the cable is fixed along a support.

* * * * *